United States Patent
Gerold

(10) Patent No.: US 6,638,329 B2
(45) Date of Patent: Oct. 28, 2003

(54) FILTER HAVING A FOLDED DUST FILTER ELEMENT AND A CLEANING DEVICE FOR THE FOLDED DUST FILTER ELEMENT

(75) Inventor: Peter Gerold, Weilheim (DE)

(73) Assignee: Hilti Aktiengesellschaft, Schaan (LI)

( * ) Notice: Subject to any disclaimer, the term of this patent is extended or adjusted under 35 U.S.C. 154(b) by 20 days.

(21) Appl. No.: 09/900,274

(22) Filed: Jul. 5, 2001

(65) Prior Publication Data

US 2002/0005032 A1 Jan. 17, 2002

(30) Foreign Application Priority Data

Jul. 7, 2000 (DE) .......................... 100 33 102

(51) Int. Cl.⁷ ............................................. B01D 46/04
(52) U.S. Cl. ............................. 55/295; 55/296; 55/299; 55/300; 55/304; 55/305; 15/352
(58) Field of Search .................. 55/295, 296, 297, 55/299, 300, 304, 305; 15/352; 95/278

(56) References Cited

U.S. PATENT DOCUMENTS

| | | | | |
|---|---|---|---|---|
| 1,295,216 A | * | 2/1919 | Schmitt ........................ 55/300 |
| 3,856,488 A | * | 12/1974 | Kato et al. .................... 55/300 |
| 4,199,334 A | * | 4/1980 | Berkhoel ....................... 55/304 |
| 4,345,353 A | * | 8/1982 | Sommerfeld ................... 55/300 |
| 4,565,555 A | * | 1/1986 | Menasian ..................... 55/300 |
| 4,661,129 A | * | 4/1987 | Nederman ..................... 55/304 |
| 5,194,077 A | * | 3/1993 | Bargiel et al. ................. 55/300 |
| 5,223,005 A | * | 6/1993 | Avondoglio ................... 55/300 |
| 5,711,775 A | * | 1/1998 | Field et al. .................... 55/300 |
| 5,829,094 A | * | 11/1998 | Field et al. .................... 55/300 |
| 6,117,200 A | * | 9/2000 | Berg et al. ..................... 55/300 |

FOREIGN PATENT DOCUMENTS

| DE | 37 34 355 A1 | * | 4/1988 | ............. A47L/9/20 |
|---|---|---|---|---|
| DE | 39 13 085 A1 | * | 12/1989 | ........... B01D/46/42 |

* cited by examiner

Primary Examiner—Duane Smith
Assistant Examiner—Jason M. Greene
(74) Attorney, Agent, or Firm—Sidley Austin Brown & Wood, LLP

(57) ABSTRACT

A filter for filtering dust-containing air including a filter insert (2) and a cleaning device (3) having a contact element (6) mechanically contacting the filter insert along an end edge (4a/4b) of a folded dust filter element (5) forming part of the filter insert.

5 Claims, 1 Drawing Sheet

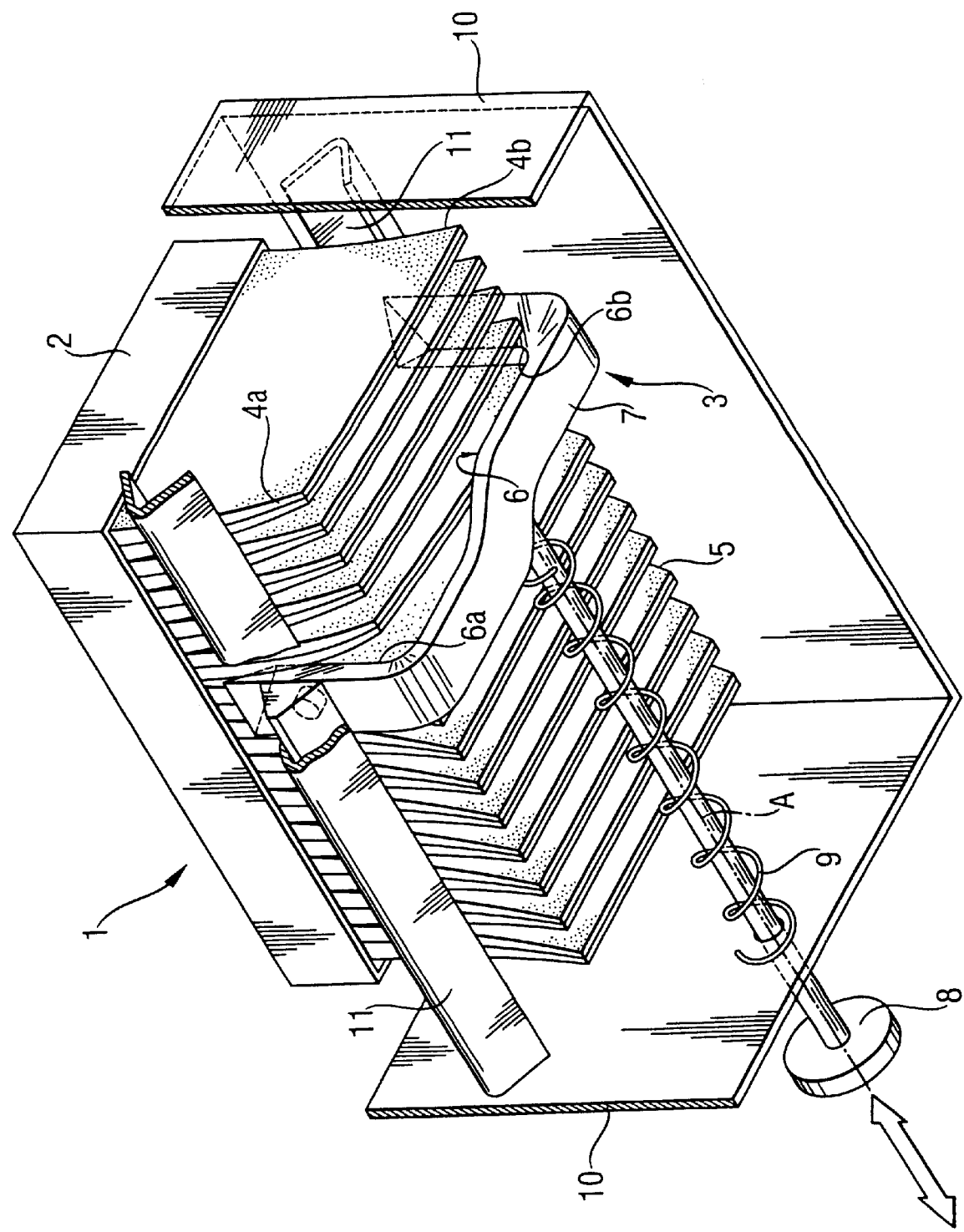

FILTER HAVING A FOLDED DUST FILTER ELEMENT AND A CLEANING DEVICE FOR THE FOLDED DUST FILTER ELEMENT

BACKGROUND OF THE INVENTION

1. Field of the Invention

The present invention relates to a filter having a folded dust filter element, which is formed, preferably, of a flat flexible material such as filter paper or cloth, and including a cleaning device for the folded dust filter element.

2. Description of the Prior Art

Folded dust filter elements, which are formed, e.g., as an active part of filters used in vacuum cleaners. In order to increase the surface of a dust filter element per volume of the filter, the flat material of the filter element is folded. As a result of an air pressure difference on opposite sides of the filter, the air stream, which contains dust particles, passes the dust filter element from one side to the other side with the dust being deposited on one side of the filter. In a while, the openings in the dust filter element become clogged, and the air flow therethrough is reduced to such an extent that the filter must be cleaned. Usually, this involves removal of the filter element and hammering the dust out.

U.S. Pat. No. 3,639,940 discloses a dust filter element which is formed as a resiliently supported filter bag that is vibrated by a cleaning device having a drive which provides for an eccentric movement of the filter bag. The overcritical load applied to the filter bag causes separation of the dust layer. A drawback of this dust cleaning system consists in that it requires the use of some types of a drive.

German Patent Publication DE 37 34 355A1 discloses a vacuum cleaner with an integrated cleaning device for a dust filter element with horizontal folds. In the disclosed vacuum cleaner, a dust layer, which is formed on the bottom of the filter element, is removed, at least partially, with a displaceable wiper. A vibration-generating shaking of the, engageable by the wiper, folds of the dust filter element, which is formed of a flexible material, results in an overcritical loading of the dust layer, leading to a further removal of the dust, whereby an additional cleaning takes place. The removal dust freely falls downward. The drawback of this resolution consists in that the wiper is in a direct mechanical contact with the active filtering flat regions of the dust filter element, which may cause their damage.

U.S. Pat. No. 3,591,888 discloses a vacuum cleaner with a dust filter element having vertical folds which are cleaned by a fold-engaging comb with a spacing between the comb teeth corresponding to the spacing between the folds. The comb contacts several folds simultaneously and is caused to vibrate as a result of an eccentric movement. The removed dust falls partially on opposite folds and finally downward. The connection of this cleaning device with cable rollers provides for self-cleaning of the filter. The drawback of this arrangement consist in that the cleaning member is in a direct mechanical contact with active filtering surfaces of the dust filter element and with the dust deposited, as a result of cleaning, on the active filtering surfaces.

Accordingly, an object of the present invention is to provide a filter with a cleaning device for the dust filter element of the filter, in which the drawbacks of the prior art are eliminated.

SUMMARY OF THE INVENTION

This and other objects of the present invention which will become apparent herein after, are achieved by providing contact means which contacts the folded dust filter element along its end edge.

The necessary vibration is provided due to the mechanical contact between the contact means and the end edge of the folded dust filter element. The end edge is formed by a zigzag line. The end edge is formed so that it is wear-resistant, e.g., by forming the end edge with a double thickness of the material, having the edges of the adjacent fold section glued to each other. The contact load, which acts radially to the fold axis, results in a three-dimensional loading which usually is asymmetrical and which leads to bulging within a separate fold. The rapid displacement of the load along the fold axis results in at least short-time vibration that causes removal of the dust layer.

The contact means is displaced in a guide rail, advantageously, against a biasing force of a spring which is arranged along the axis of symmetry and provides for the return of the contact means to its initial position when a force applied by a user to an actuation member is removed. In this way, the folds are contacted twice upon a single actuation of the actuation means.

Advantageously, the contact means contact both end edges. To this end, the contact means is provided on an appropriately dimensioned contact shackle that encompasses the dust filter element in a direction transverse to the fold axis and is displaced along the fold axis. As a result, a symmetrical load, with respect to the fold axis, is applied to the dust filter element eliminating the need in an additional counter support.

Advantageously, the contact means has two opposite contact elements offset relative to each other by half of the fold section width or a full fold section width, whereby both surfaces of a single fold or two adjacent folds are deformed relative to each other, which increases the deformation upon application of the same force. The contact shackle is advantageously formed as a bent part which again doubles the number of contacts upon displacement of the shackle.

Advantageously, the dust filter element is formed as a part of a removable filter insert, with the fold axis extending horizontally, and the dust layer being formed on the bottom surface. In this case, advantageously, upwardly removable filter insert is inserted in the beneath-located contact shackle.

Advantageously, the contact shackle and/or the guide rail are formed of a triangular profile, without horizontal surfaces, which prevents any significant deposition of dust thereon.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

Single FIGURE of the drawings show a perspective, partially cross-sectional view of a filter with a cleaning device according to the present invention.

DETAILED DESCRIPTION OF THE PREFERRED EMBODIMENT

A filter 1 according to the present invention, which is shown in the drawings, includes a filter insert 2 and a cleaning device 3. The filter insert 2 is arranged in a mechanical contact, along a zigzag line-forming end edge 4a/4b of a folded dust filter element 5, with a displaceable along a fold axis A, contact element 6 provided on a contact shackle 7 of the cleaning device 3. The bent contact shackle 7 is located below of the horizontally arranged filter insert 2 and encompasses a filter section of the filter insert 2 in a direction transverse to fold axis A. The contact shackle is connected with an actuation element 8 and is connected with a filter housing 10 by a return spring 9. The contact element 6 on the contact shackle 7 is displaced along the fold axis A in a guide rail 11. The contact element 6 has two opposite contact elements 6a, 6b which directly mechanically contact both end edges 4a, 4b of the dust filter element 5, as shown in the drawing. The guide rail 11, the shackle 7 are formed each of a triangular profile.

Though the present invention was shown and described with references to the preferred embodiment, such are merely illustrative of the present invention and are not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A filter for filtering dust-containing air, comprising a filter insert (2) having a folded dust filter element (5); and a cleaning device (3) including contact means (6) for directly mechanically contacting the filter insert (2) along an end edge (4a/4b) of the folded dust filter element (5), wherein the contact means (6) is displaceable along a fold axis (A), wherein the contact means (6) has two contact elements (6a, 6b) that are arranged in a mechanical contact with two end edges (4a, 4b) of the folded dust filter element (5), respectively, and wherein the filter further comprises guide rail (11) on which the contact means (6) is guiding along the fold axis (A).

2. A filter according to claim 1, further comprising a contact shackle (7) for mechanically connecting at least one contact element (6a, 6b) with the cleaning device (3).

3. A filter according to claim 2, wherein the contact shackle (7) is bent over one section of the folded dust filter element (5).

4. A filter according to claim 1, further comprising actuation means (8) connected with the contact means (6), and a return spring (9) for connecting the contact means (6) with a filter housing (10).

5. A filter according to claim 1, further comprising a contact shackle (7) for mechanically connecting the contact means (6) with the cleaning device (3), and wherein at least one of the contact means (6), the guide rail (11), and the contact shackle (7) is formed of a triangular profile.

* * * * *